United States Patent
Hanson et al.

[11] Patent Number: 6,103,035
[45] Date of Patent: Aug. 15, 2000

[54] VIBRATORY WELDED WINDOW AND DOOR JOINTS, METHOD AND APPARATUS FOR MANUFACTURING THE SAME

[75] Inventors: Craig A. Hanson, Oakdale; Anthony W. Brant, Alexandria, both of Minn.

[73] Assignee: Andersen Corporation, Bayport, Minn.

[21] Appl. No.: 09/246,593

[22] Filed: Feb. 8, 1999

Related U.S. Application Data

[60] Division of application No. 08/742,734, Nov. 1, 1996, Pat. No. 5,902,657, which is a continuation-in-part of application No. 08/518,229, Aug. 23, 1995, abandoned, which is a continuation-in-part of application No. 08/379,050, Jan. 27, 1995, abandoned.

[51] Int. Cl.$^7$ .................................... B29C 65/06
[52] U.S. Cl. .................. 156/73.5; 156/304.2; 156/304.6
[58] Field of Search .................. 156/73.1, 73.5, 156/73.6, 304.1, 304.2, 304.5, 304.6, 580, 580.1, 580.2; 264/68; 228/2.3, 112.1, 113, 114.5, 2.1

[56] References Cited

U.S. PATENT DOCUMENTS

| | | | |
|---|---|---|---|
| 2,326,549 | 8/1943 | Miller | 189/75 |
| 2,708,649 | 5/1955 | Cunningham | 154/116 |
| 3,351,512 | 11/1967 | Von Zelewsky et al. | 156/580 |
| 3,376,179 | 4/1968 | Balamuth | 156/73.1 |
| 3,418,196 | 12/1968 | Luc | 161/38 |
| 3,468,731 | 9/1969 | Obeda | 156/73.1 |
| 3,586,590 | 6/1971 | Brenneisen | 156/580 |
| 3,777,967 | 12/1973 | Searle et al. | 228/2.1 |
| 3,899,378 | 8/1975 | Wragg et al. | 156/73.5 |
| 3,920,504 | 11/1975 | Shoh et al. | 156/580 |
| 3,935,056 | 1/1976 | Koyama et al. | 156/507 |
| 4,090,799 | 5/1978 | Crotti et al. | 403/401 |
| 4,224,091 | 9/1980 | Sager | 156/73.5 |
| 4,280,859 | 7/1981 | Thompson | 156/73.5 |
| 4,391,054 | 7/1983 | Schovee | 40/154 |

(List continued on next page.)

FOREIGN PATENT DOCUMENTS

| | | |
|---|---|---|
| 754521 | 3/1957 | Canada . |
| 1467193 | 1/1967 | France . |
| 807848 | 4/1951 | Germany . |
| 2110540 | 10/1972 | Germany . |
| 2212910 | 11/1972 | Germany . |
| 128303 | 11/1977 | Germany . |
| 8133461 | 12/1983 | Germany . |
| 3641019 | 6/1988 | Germany . |
| 9111121 | 10/1991 | Germany . |
| 54-010254 | 1/1979 | Japan . |
| 57-157717 | 12/1982 | Japan . |
| 1002120 | 3/1983 | U.S.S.R. . |
| 2020772 | 11/1979 | United Kingdom . |
| 2033394 | 5/1980 | United Kingdom . |
| 2270864 | 3/1994 | United Kingdom . |
| WO 93/02704 | 2/1993 | WIPO . |
| WO 93/10935 | 6/1993 | WIPO . |

OTHER PUBLICATIONS

Dube et al., "Reaction Injection Pultrusion of Thermoplastic and Thermoset Composites", *Polymer Composites*, vol. 16, No. 5, pp. 378–385 (Oct. 1995).

Giese, M. et al., "Vibration Welding of Random Glass Mat Reinforced Thermoplastic Composites", *ANTEC*, pp. 884–887 (1992).

Hatcher, W.J., "Vibration Welding of Automotive Thermoplastic Box Beam Bumpers", *Branson Sonic Power Company*, Danbury, Connecticut, pp. 133–134.

"ICS News", *Instruments & Control Systems*, p. 5 (Jan. 1980).

(List continued on next page.)

*Primary Examiner*—James Sells
*Attorney, Agent, or Firm*—Merchant & Gould P.C.

[57] ABSTRACT

A method and apparatus for connecting framing components for windows and doors is disclosed. The method involves the use of a vibrating source, which when applied to the frame components, locally excites the surface, thereby conditioning the members to be welded.

25 Claims, 12 Drawing Sheets

U.S. PATENT DOCUMENTS

| | | | |
|---|---|---|---|
| 4,492,063 | 1/1985 | Schock et al. | 52/309.7 |
| 4,668,316 | 5/1987 | Sager | 156/73.1 |
| 4,701,229 | 10/1987 | Arakawa et al. | 156/69 |
| 4,715,911 | 12/1987 | Johansson et al. | 156/69 |
| 4,742,647 | 5/1988 | Pacca | 49/505 |
| 4,844,320 | 7/1989 | Stokes et al. | 228/102 |
| 4,856,230 | 8/1989 | Slocomb | 49/504 |
| 4,941,288 | 7/1990 | Morton | 49/504 |
| 4,944,977 | 7/1990 | Shantz et al. | 428/36.92 |
| 4,997,500 | 3/1991 | Arnett et al. | 156/73.5 |
| 5,026,445 | 6/1991 | Mainolfi | 156/73.5 |
| 5,069,947 | 12/1991 | Hopperdietzel | 428/38 |
| 5,105,581 | 4/1992 | Slocomb, Jr. | 49/504 |
| 5,160,061 | 11/1992 | Stolzman | 220/359 |
| 5,189,841 | 3/1993 | Arbetter | 49/504 |
| 5,293,723 | 3/1994 | Slessor | 52/213 |
| 5,406,768 | 4/1995 | Giuseppe et al. | 52/730.4 |
| 5,439,546 | 8/1995 | Brickenstein | 156/304.2 |
| 5,460,317 | 10/1995 | Thomas et al. | 228/112.1 |

OTHER PUBLICATIONS

Murch, M.G., "The Effect of a Dual Stage Pressure Cycle on the Linear Vibration Welding of Thermoplastic—a Preliminary Study", pp. 177–202.

Oxley et al., "Recent Developments in Stack Gas Control Technology", pp. 587–601.

Pecha, E. et al., "Production Machines and Technical Application for Hot Plate—and Vibration Welding", *Advances in Joining Plastics and Composites*, Bradford Yorkshire UK, 10–12, pp. 262–273, (Jun. 1991).

Schlarb, A.K. et al., "Vibration Welding, A Materials Technology View of a Mass–Production Method", *Kassel, Kunststoffe German Plastics* vol. 78, No. 6, pp. 30–33 (1988).

Stokes, V.K., "Vibration Welding of Thermoplastics. Part II: Analysis of the Welding Process", *Polymer Engineering and Science*, vol. 28, No. 11, pp. 728–739 (Mid–Jun. 1988).

Stokes, V.K., "Vibration Welding of Thermoplastics. Part IV: Strengths of Poly(Butylene Terephthalate), Polyetherimide, and Modified Polyphenylene Oxide Butt Welds", *Polymer Engineering and Science*, vol. 28, No. 15, pp. 998–1008 (Mid–Aug. 1988).

"Vibration Welding Joins Thermoplastics", *Society of Automotive Engineers, Inc.*, vol. 92, No. 7, pp. 40–45 (1984).

"Vibration Welding of Moulded Parts and Semi–Finished Parts of Thermoplastic Polymers in Mass Production", *Welding in the World*, vol. 35, No. 2, pp. 138–146 (1995).

Watson, M.N., "Joining Plastics in Production", *The Welding Institute*, pp. 83–93.

"Welding Thermoplastic Plastics Heated Tool Butt Welds," *German Welding Society*, Guidelines DVS 2207 Part 25, pp. 1–7 (Oct. 1989).

White, P., "Vibration Welding of Theromoplastics", *Joining & Materials*, pp. 276–279, (Dec. 1988).

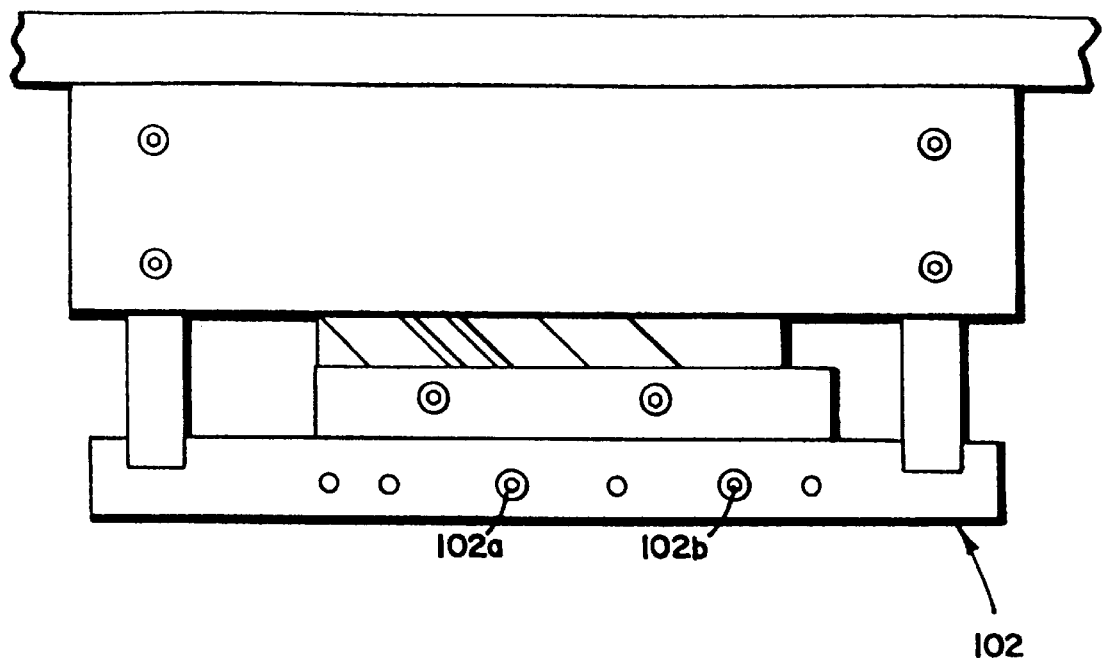
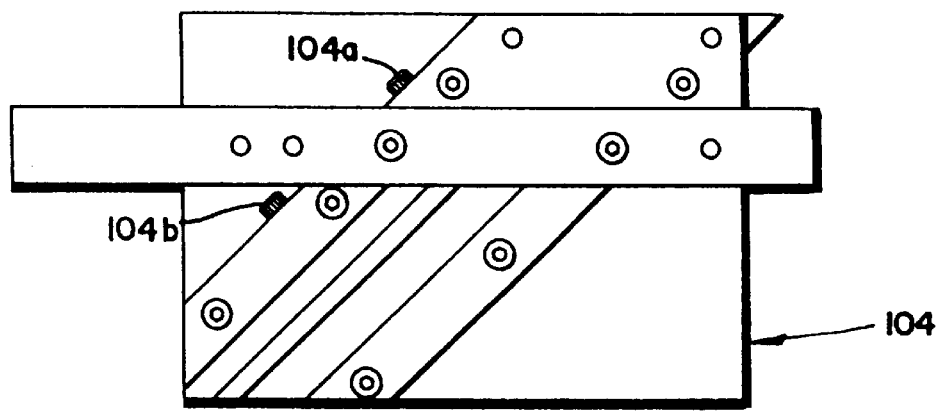
FIG.5

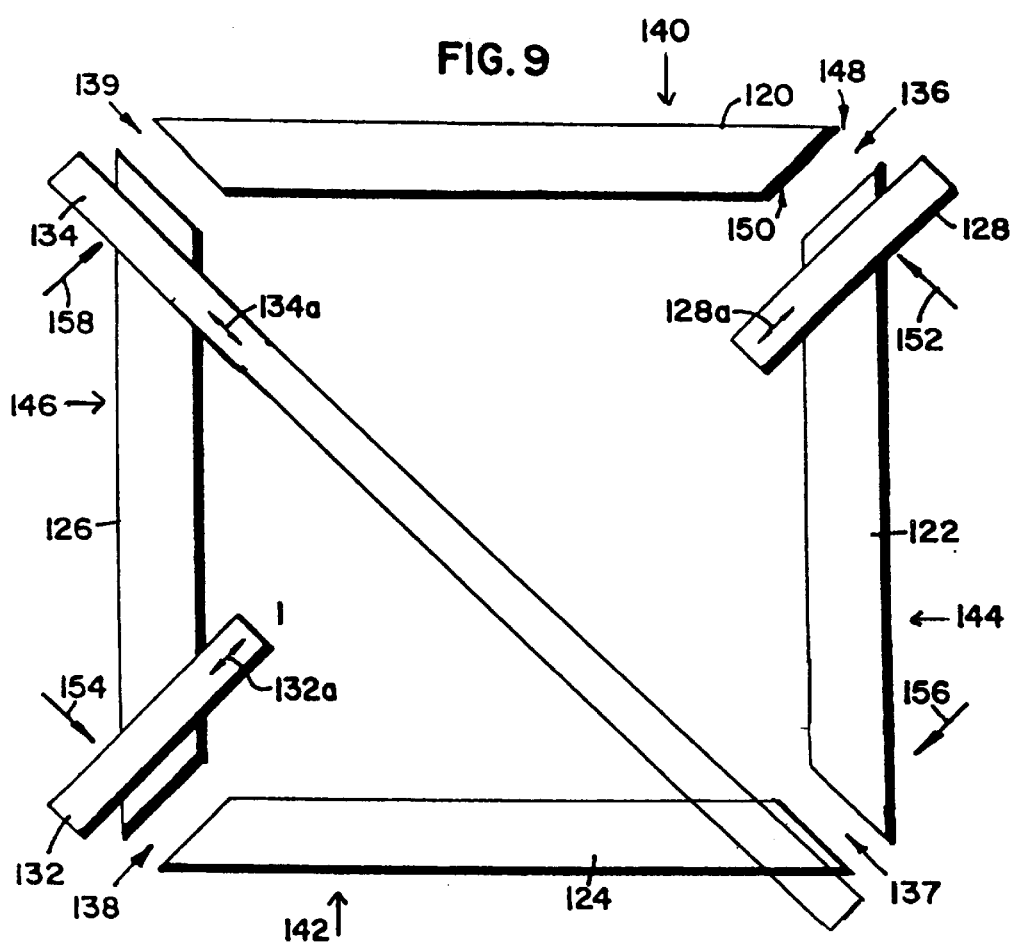

VIBRATORY WELDED WINDOW AND DOOR JOINTS, METHOD AND APPARATUS FOR MANUFACTURING THE SAME

This application is a Divisional of application Ser. No. 08/742,734, filed Nov. 1, 1996 U.S. Pat. No. 5,902,657 which is a continuation in part of application Ser. No. 08/518,229 filed Aug. 23, 1995, abandoned which is a continuation in part of application Ser. No. 08/379,050 filed Jan. 27, 1995, abandoned.

FIELD OF THE INVENTION

The invention is directed to vibratory welding of window and door components, and to a method and apparatus for manufacturing the same.

BACKGROUND OF THE INVENTION

Many technological improvements in window and door design have been made available over the last several years. For instance, the insulating properties of newer window constructions are greatly improved over older window constructions, which can provide a significant energy savings to property owners. Consequently, a significant need has developed to replacing windows and doors during remodeling of older homes and buildings with newer more efficient components.

However, most conventional windows, doors, patio doors, etc. are currently built to standardized dimensions. Since different sizes of windows and doors require differently sized components, it is common practice for manufacturers to offer only a limited number of standardized sizes of windows and doors, which reduces the overall manufacturing complexity and costs of these structures based on the efficiencies obtained through economies of scale.

Many older windows and doors do not conform to standard sizes, and is often difficult to find replacement windows which exactly fit the roughed-in dimensions of a window or a door to be replaced. Therefore, some standard sizes of windows and doors are often not acceptable substitutes as replacement windows. Often, replacement applications may require custom built windows or doors, which typically require individual components to be separately manufactured to size. Consequently, custom window construction does not obtain the benefits of economy to scale, e.g. high volume production of structures used in standardized parts. Thus, many custom windows and doors are significantly more expensive than their standardized counterparts.

Therefore, a need exists for a method of manufacturing windows and doors of custom sizes and shapes which is fast and provides an inexpensive manufacturing process.

A need also exists for improving the manufacturing of standard size windows made from new materials. Many new polymeric and composite materials are being used for the manufacture of standard sized and replacement sized windows, and thus the manufacturing needs for all styles of windows and doors needs to be modified to accommodate these new materials.

Along this line, a need has developed for improved joint structure for joining framing components made from new materials, such as window sashes, window frames, door frames, etc. For example, windows typically require joint structures for sashes which retain a window glass assembly within a frame. A window glass assembly is typically a single pane of glass, or alternatively, a self-contained, multi-paned insulated glass unit whereby two or more panes are stacked and sealed about the perimeters, with a partial vacuum and/or an insulating gas such as argon contained within the sealed space between the panes.

Generally, a sash used to retain a window glass assembly includes framing components which are generally L-shaped in cross-section. A silicone sealant is layered along the inside of the frame, and then the window glass assembly is placed in the frame against the silicone sealant. A glazing bead is then installed around the open side of the sash to retain the window glass assembly therein.

It is also known to include spacer blocks sandwiched between the edges of the window glass assembly and the L-shaped channel in the sash, which forms a condensation channel and centers the pane in the sash. Further, by constructing the sash members of a weldable plastic, it is known that custom sashes may be constructed by miter cutting individual members to size, then butt welding the ends of the sash members together.

Prior to this invention, this butt welding has occurred through heat welding or ultra-sonic welding.

Heat welding involves heating a platen of some type, placing the heated platen in contact with the surface to be welded (oftentimes a thermoplastic material of some type) heating the bonding surface until there is flow, withdrawing the heated platen, and then placing the two bonding surfaces in contact. Thereafter, the heated bonded surface must cool. Heat welding has numerous drawbacks. One drawback is the length of time necessary to heat the welding surfaces to a temperature sufficient for welding. This can take in excess of 30 seconds, which is very slow from a manufacturing point of view when often times millions of units are assembled over the course of a year. Another drawback is if the material which is being welded has good thermal properties, the transfer of heat can be slow so cooling is often slow. The heated surfaces may often experience degradation. Thus a more efficient method of creating a welded joint is needed. Another process for welding window frames is disclosed is U.S. Pat. No. 4,856,230, assigned to Slocomb Industries, which describes a method of securing vinyl window frames together with ultra-sonic welding. U.S. Pat. Nos. 5,105,581, 4,224,091, and 4,090,799 all further discuss the use of ultra-sonic welding techniques in window applications. However, the use of ultra-sonic welding, which requires a horn to be positioned over the weld, whereby the horn admits ultra-sonic frequencies, has numerous drawbacks. In order for an effective weld to take place, often times it is necessary to have multiple horns, with multiple horns for each weld, in that often times with a joint having complex geometry, one horn cannot sufficiently weld the joint portion which is opposite the point farthest from the horn. Further, ultra-sonic welding, although faster than thermal welding involving a heated platen, still suffers from a somewhat slow weld time. A typical ultra-sonic weld may take approximately five or more seconds in order for the weld faces to be melted sufficient such that a weld can occur. A further disadvantage with both thermal heat or ultra-sonic welding is that anytime a thermal plastic material is heated and welded, degradation and excess flash will occur around the weld. As the two faces are bonded together, excess thermoplastic flow occurs which results in the thermoplastic material flowing outside the weld and on the surface of the members which form the weld. This degraded excess flash must be removed in that it diminishes the decorative appearance of the weld. As a general rule, the longer the weld takes to form, the more flash will occur. Thus, it is desirable to produce a weld in a very short period of time, thus minimizing the flash.

There is also a need in the art for a window assembly process whereby sash members may be assembled around a glass assembly in a faster and less expensive manner while having an improved decorative appearance. Welding sash around glass is advantageous in that the sash is ready to be incorporated in a window once the weld is completed. The alternative, which is a slower process, involves forming the sash first, inserting the glass, and sealing the glass in the sash. This results in an operation requiring two or more steps, which again increases the time for manufacture of the product. Thus, there is a need for a process which incorporates the glass and welds the sash members in one quick operation.

There is also a need to quickly weld all types of corners found in the fenestration industry, including but not limited to, mitered corners, mortis and tenon joints, compound mitered corners and non-flush corners just to name a few.

These and other problems associated with the prior art are addressed by the present invention.

SUMMARY OF THE INVENTION

The invention provides a joint structure whereby the framing components may be securely joined by a vibratory method, which forms a joint structure having a strong weld with minimal flash in a very brief period of time.

In accordance with one aspect of the invention, a window is provided which includes a window glass assembly having interior and exterior sides; first, second, third and fourth members coupled to form a frame and a glass receiving channel formed between interior and exterior sides of the members for supporting the interior and exterior sides of the window glass assembly; and a joint structure formed by vibratory welding, thereby interconnecting adjacent ends of the members. The members can be any lineal members, of any length, but are preferably in the window and door industry.

The process known as vibratory welding occurs from an energy excitation source that operates to heat the mating surfaces to be joined, and generally only that portion of the surface to be joined. Such a system vibrates two or more surfaces against one another until a melt pool of material is formed, thus producing a weld. At this time, little further heating beyond the weld surfaces takes place. This results in heat without degradation of the adjacent areas around the weld. The weld pool thereafter allows for the two surfaces to be joined to create a strong weld with minimal weld flash and degradation.

The weld is preferably a corner or mitered weld. This "off axis" weld, meaning not a butt or 180° weld, is a particularly advantageous weld to achieve with the present invention. This off axis weld includes mitered welds, compound mitered welds, multi-planar welds wherein the welding surface has different planes, mortis and tenon joints as well as other welds or joints used in the window and door industry as well as other industries addressed herein.

The present invention minimizes the "zone of disturbance" around the weld. The "zone of disturbance" is the area around the weld where the orientation of the welded material differs from the orientation throughout the remaining portion of the welded part. The present invention has the advantage of having a smaller zone of disturbance, which results in a stronger weld and minimizes any unwanted reorientation of the parts material, which is fibrous.

An apparatus is also described and claimed which receives members and welds the corners using the vibratory methods described and claimed herein.

DESCRIPTION OF THE DRAWINGS

FIG. 5 illustrates two experimental fixtures which each hold a member to be welded together.

FIG. 9 illustrates a schematic of an apparatus capable of welding a four member frame together.

FIG. 10 illustrates a schematic of an apparatus capable of welding a three member frame together.

DETAILED DESCRIPTION OF THE INVENTION

The present invention generally describes a vibratory method and apparatus to weld flowable members. This generally requires at least two members, which are to be joined, whereby at least one member is moved rapidly, at a frequency greater than about 50 Hz, preferably about 100 to 300 Hz, and most preferably about 150 to 250 Hz. This frequency of movement causes localized heating and flow of the member surface sealing faces, which allows the member to be welded to another member or surface sealing face. There is essentially no limit on the upper frequency value except the limitation encountered by the ability of the fixtures to vibrate at high frequencies. Thus, if an apparatus is built to achieve frequencies of about 1000 Hz or higher, this apparatus is also envisioned in the present invention.

Figure 1:
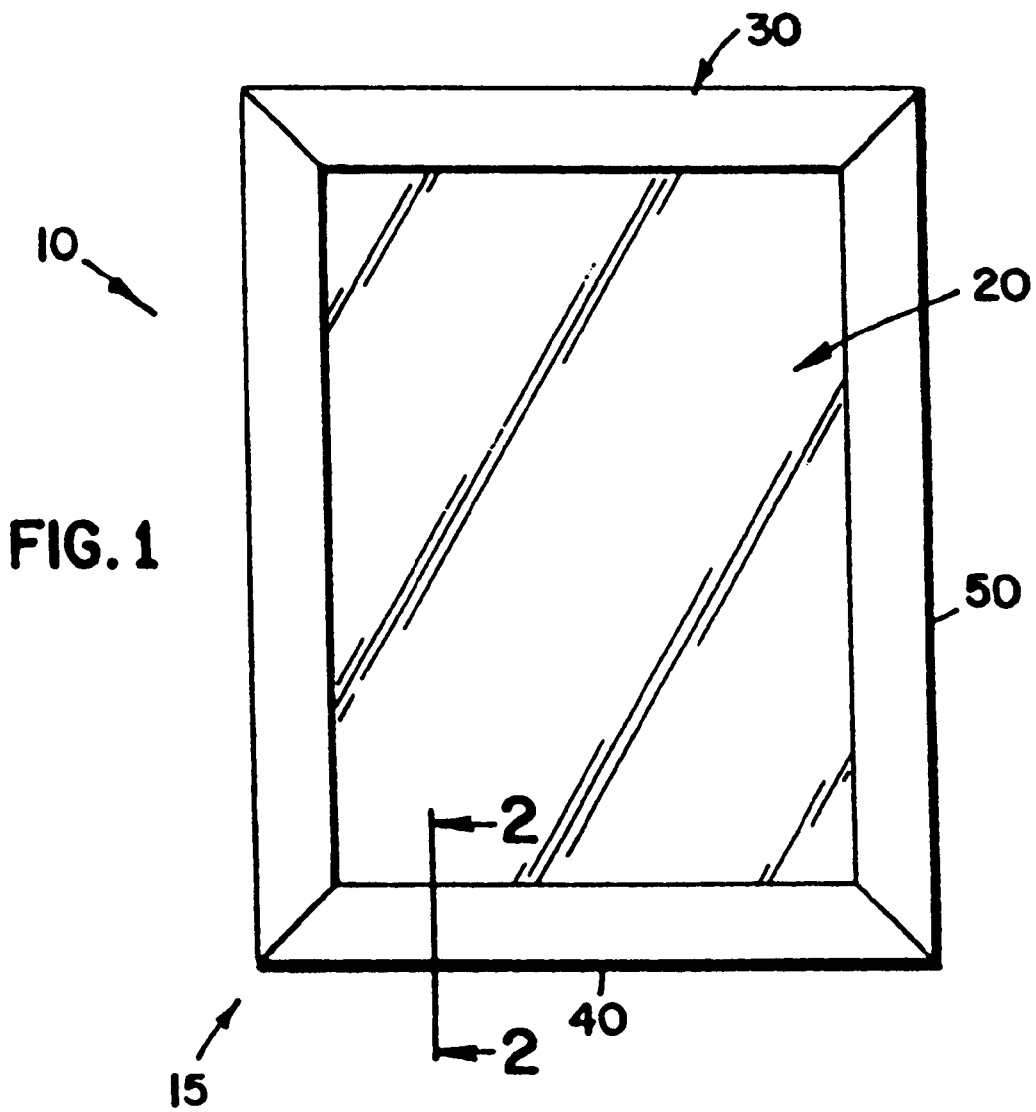
FIG. 1 is a sash assembly.

The members to which the present invention is directed are preferably the components of windows and doors. Other areas of technology including the toy industry, the refrigerator and appliance industry, the building industry, picture industry, automotive industry and other industries assembling lineals may also benefit from the present invention and are envisioned herein. A typical window is shown in FIG. 1 as 10, with stiles 30 and 40, and rails 50 and 60. A mitered corner 15 is also shown. The glass 20 is shown in place. The mitered corner 15 is a type of weld envisioned by the present invention. Any number of sides may be welded from an arched member frame to a multi-sided window such as a pentagon could be welded.

The particular members to be welded can be a variety of materials. Although the method is preferably directed at thermoplastic members to be used in the manufacturing of window and door products, any flowable, thermoplastic material which needs to be welded could be used in the present invention. The present invention works well with thermoplastic polymers such as poly(vinyl chloride), low and high density polyethylene, polypropylene, poly(vinyl acetate), ABS polymers and any other polymers which are used in window and door parts.

The present invention also works well with thermoplastic composites. Typical composites which could be used include poly(vinyl chloride)/wood fiber composites such as those disclosed in U.S. Pat. No. 5,406,768, which is incorporated herein by reference. Composites which have thermally insulating materials such as wood have inherent problems with heat welding since heat transfer is slow. Thus, vibration welding, with the heat building up at the face of the weld, is particularly suited for composites which have thermal insulating properties. Composites including thermoplastic and non-flowable materials such as a thermoset material are also envisioned in the present invention. The present invention also works with a non-thermoplastic coated with a flowable material. The only requirement is there must exist some flowable material which can create the weld.

Figure 2:
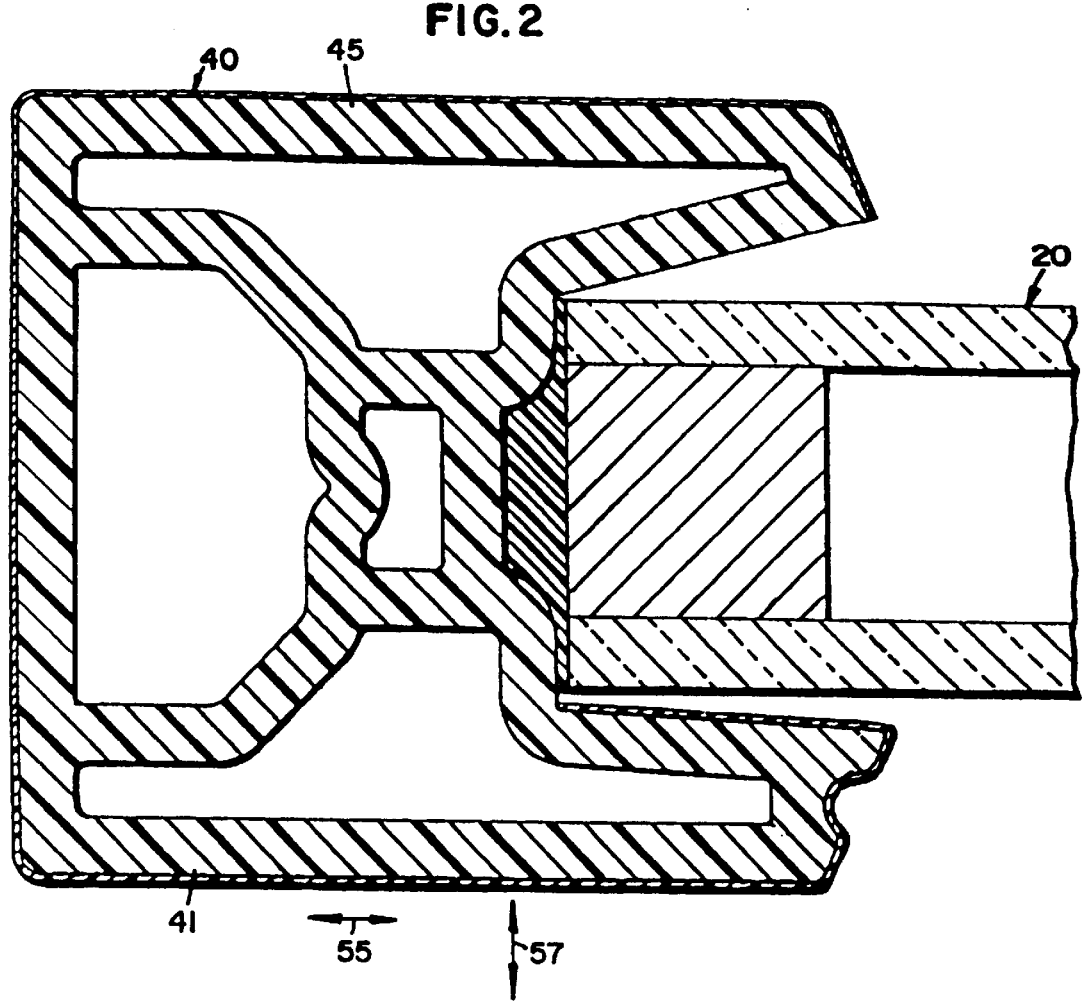
FIG. 2 is a cross-sectional view of the profile of a rail sash member in the sash of FIG. 1, taking along line 2—2.
Figure 3:
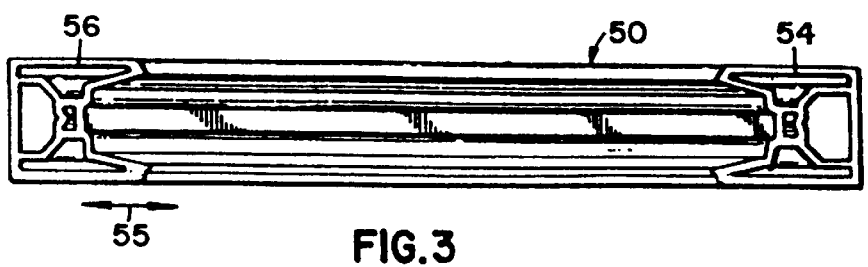
FIG. 3 is a side view of a typical member which is to be welded into a door or window part.

The usefulness of the present invention in the window industry is that the members used to assemble windows and doors often times have complicated profiles to accommodate the insertion of the glass, weather stripping, and opening within the dwelling in which the window or door is to be inserted. This complex profile is generally not a solid profile, but rather has many different cut surfaces, with oftentimes the majority of the cross-sectional space not having any material at all. The cross section is also complex, unlike a simple tube, and may have internal ribs or channels running through the member. FIGS. 2 and 3 disclose typical profiles. FIG. 2 shows a stile or rail 40, with an insulated glass unit 20 situated therein. The present invention allows welding to occur of these members, around the glass, which will be described below.

There are different methods envisioned to achieve a weld using the vibratory methods of the present invention. The first vibratory method involves vibrating at least one of the members. Referring to FIG. 3, member 50 could be vibrated while another member (not shown) could be held stationary, in a jig, with its face against face 54. (FIG. 4, without platen 70, shows two members in position to be welded as well). Preferably, the vibration would occur in a two dimensional direction, which is indicated by the direction of the arrows 55. Member 50 could be vibrated in the direction of arrow 55 at a frequency of about 200 Hz. This vibration would heat the sealing faces of both the members at which the vibration is occurring. Thus in FIG. 3, face 54 would be heated due to the friction created by another member's face vibrating against face 54. As the face 54 is heated up, a pool of the melted material would be created, which at this point, the vibrating member 50 would cease its vibration, whereupon the pool of material at the interface of each member would solidify, thereby creating a weld at the interface.

In another method, both members could be vibrated at a frequency, possibly to shorten the necessary weld time even further. Both members could be moved in the direction of arrows 55. The vibration frequency of both members would preferably be in a range of about 50 to 500 hz.

Figure 4:
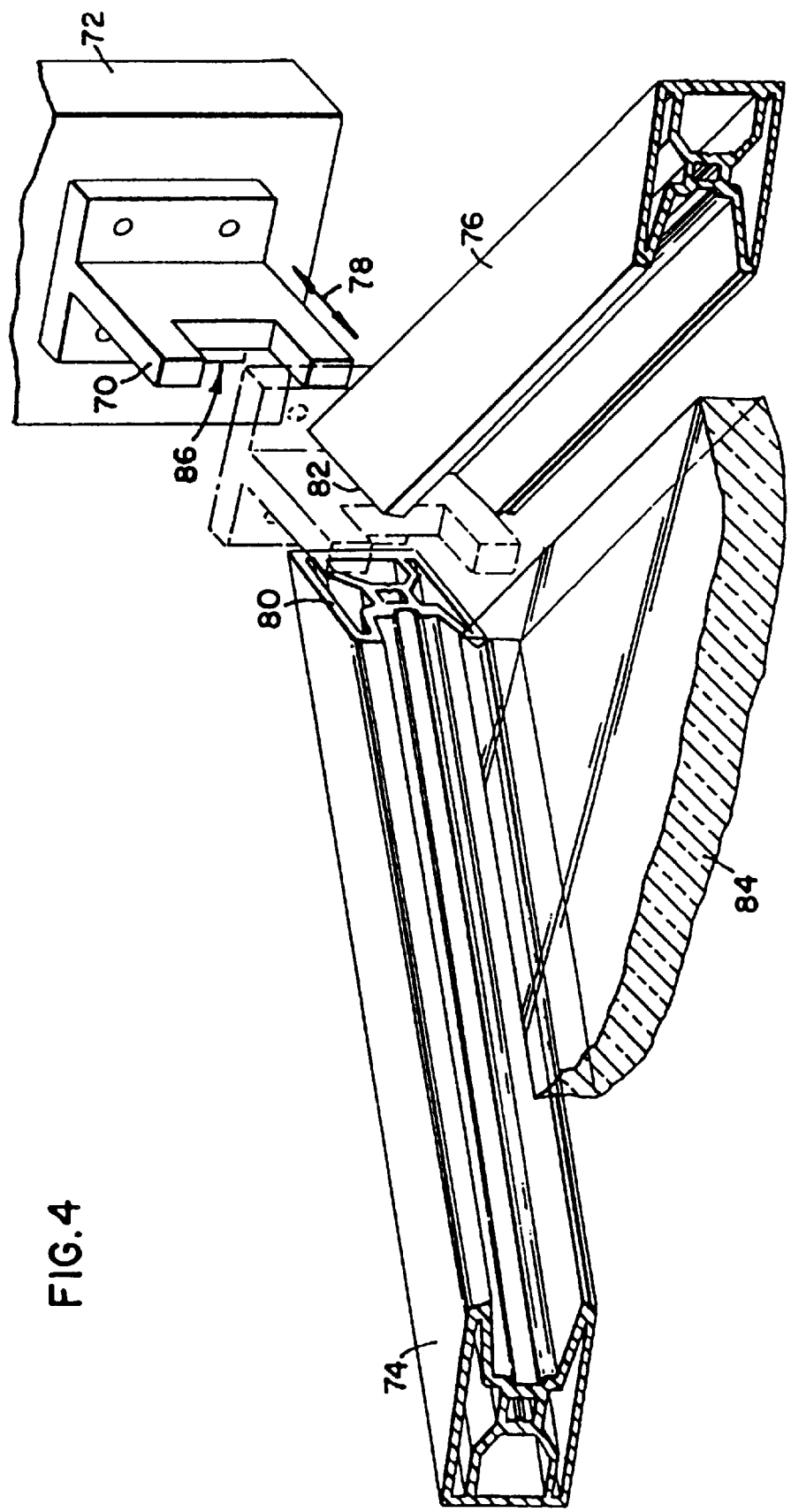
FIG. 4 is a perspective view of a vibrating platen consistent with the invention, showing the platen disposed between opposing stile and rail sash members prior to the vibratory welding operation.

A third method envisioned involves a platen of some type interfacing between the two members. This is shown in FIG. 4, with a platen shown as 70. FIG. 4 shows platen 70 in a withdrawn mode, however, the mode of vibration is shown with platen 70 in phantom, between members 74 and 76. This platen 70 would be driven by an energy source 72 which would vibrate the platen 70 at a particular frequency, approximately 50 to 500 Hz, preferably about 100 to 300 and most preferably about 150 to 250. The preferred direction of vibration is in a back and forth motion, which is shown as arrow 78. This vibrating platen 70 could be in contact with each member's face 80 and 82, either simultaneously or in an alternative fashion, or some combination thereof, such that the faces 80 and 82 would be excited, thus creating flow of the face material. The platen 70 could just contact one member's face as well. As a pool of material is generated, faces 80 and 82 become liquid, the vibrating platen 70 would be withdrawn, and the members would be moved into an adjoining relationship. Thereafter, the liquid material at the interface between the faces 80 and 82 of members 74 and 76 would solidify resulting in a weld. The platen could also be heated and could be considered an improvement to hot plate welding whereby frictional heat aids the heating process.

The platen 70, preferably, has notch 86 cut into 70. This allows the vibratory weld to occur with the glass 84 in place. The platen 70 can move in and out, in the direction of arrow 78. The presence of the notch 86 prevents platen 70 from contacting and breaking glass 84. After faces 80 and 82 are conditioned to be pushed together to form a weld, members 74 and 76 are pushed together, with glass 84 residing in the groove of members 74 and 76. Thus, in manufacturing, a pane of glass is situated with two stiles and two rails surrounding the glass. The above welding occurs at the four interfaces, and the members are secured, with the glass glazed into place.

It has been found that the critical element in welding, the "zone of disturbance", is much less in vibration welding than in hot plate welding. The "zone of disturbance" is the area around the weld wherein the material's orientation differs from that which was not exposed to the thermal stresses around the weld. More particularly, in the preferred embodiment of the present invention, a wood fiber/PVC composite is used. This composite material is described in U.S. Pat. Nos. 5,406,768, 5,441,801, and 5,486,553 and is incorporated herein by reference. This composite material has short wood fibers which are blended with a thermoplastic material such as polyvinyl chloride. The composition material is extruded or injection molded into a variety of shapes, preferably into members to be assembled into windows. Orientation of the fibers occurs during the extrusion and injection molding process, and typically such fibers are aligned at a 45° angle with respect to the weld line. This is evident in FIGS. 12–15. However, in the weld area, which is the zone of disturbance, it can be seen in FIGS. 12–15 that the fibers are oriented almost parallel to the weld line. This orientation occurs as the result of thermal disturbance which occurs at the interface of the weld. It has been shown by others that the fiber misalignment in the zone of disturbance decreases the modulus of the material. It has also been found that fiber misalignment results in undesirable thermal expansion or thermal shrinkage.

Thus, a narrower zone of disturbance is desirable thereby improving the properties of the welded product. Upon viewing FIGS. 12–15, it is apparent that the zone of disturbance is approximately five times larger with the heat weld as compared to the vibratory weld of the present invention. There is significant fiber realignment in the large zone of disturbance of the heat weld vis-a-vis the vibration welded product.

Figure 12:
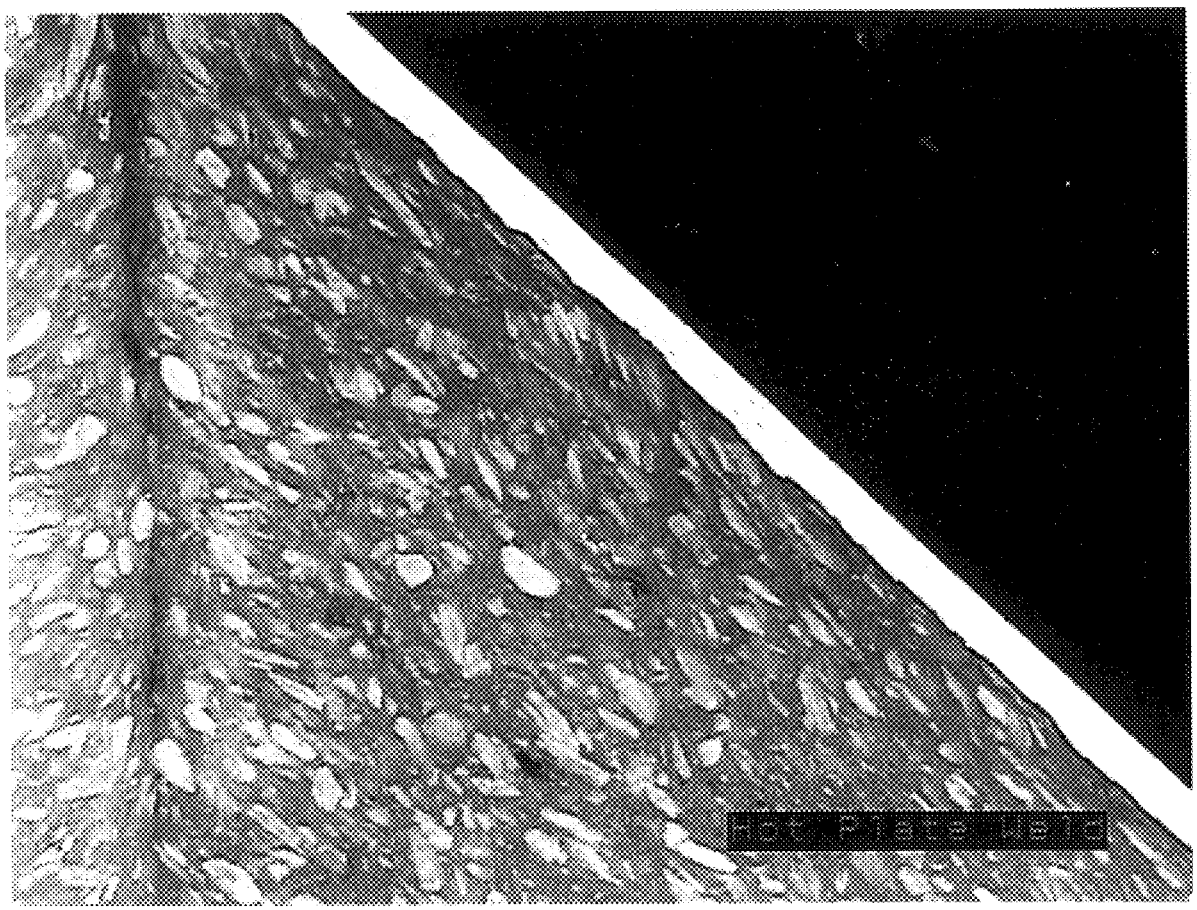
FIG. 12 illustrates a cross-sectional view of a weld of two composite members, with the weld occurring with the use of hot plates.
Figure 13:
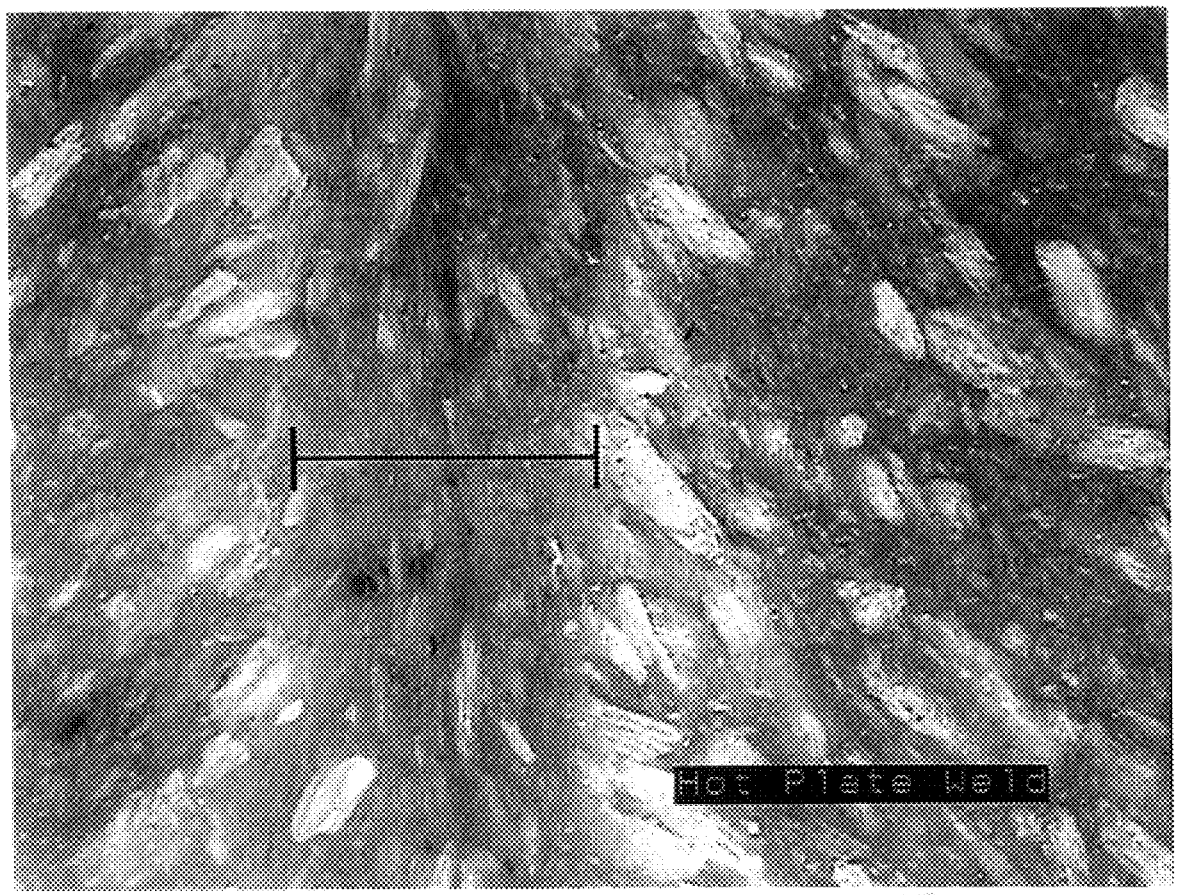
FIG. 13 is a close-up view of the weld area shown in FIG. 12.
Figure 14:
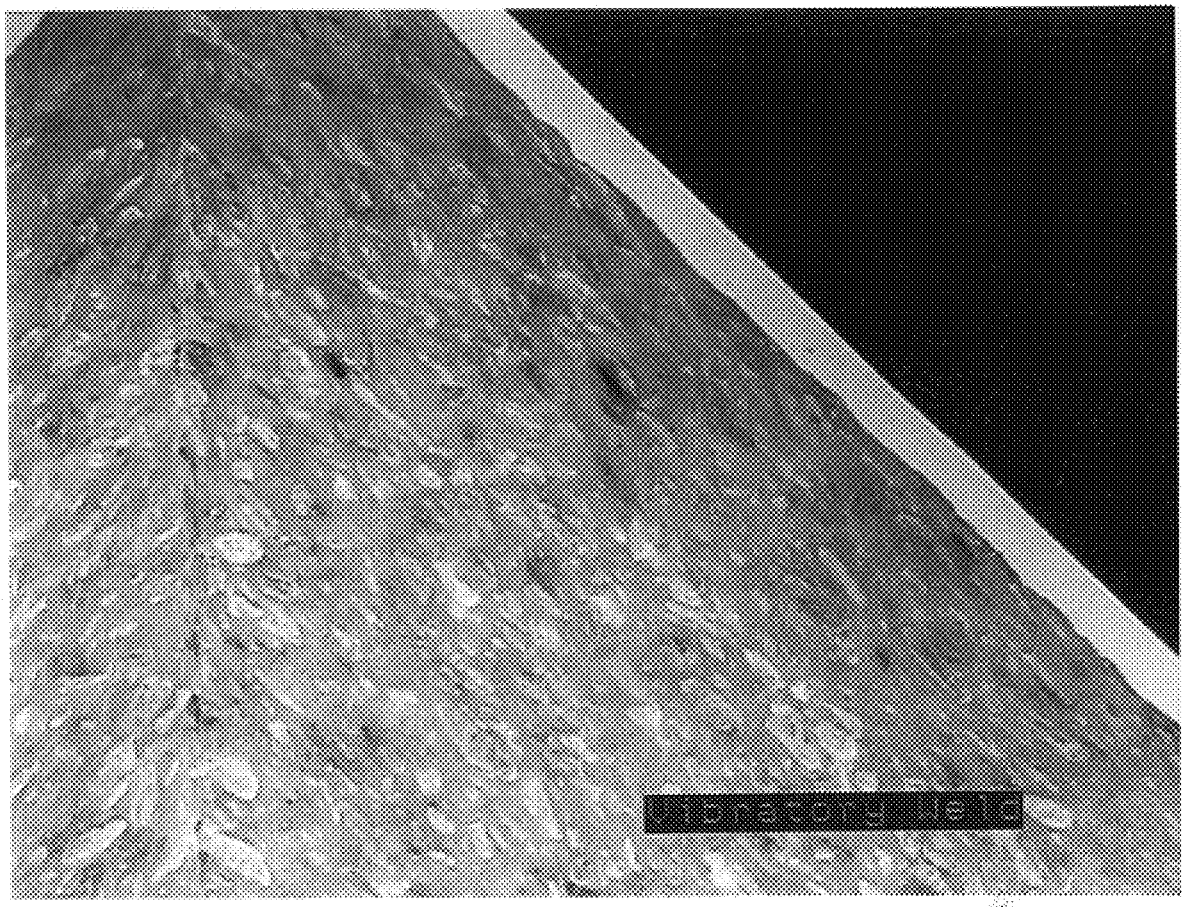
FIG. 14 is a cross-sectional view of a weld area using vibratory welding methods disclosed herein.
Figure 15:
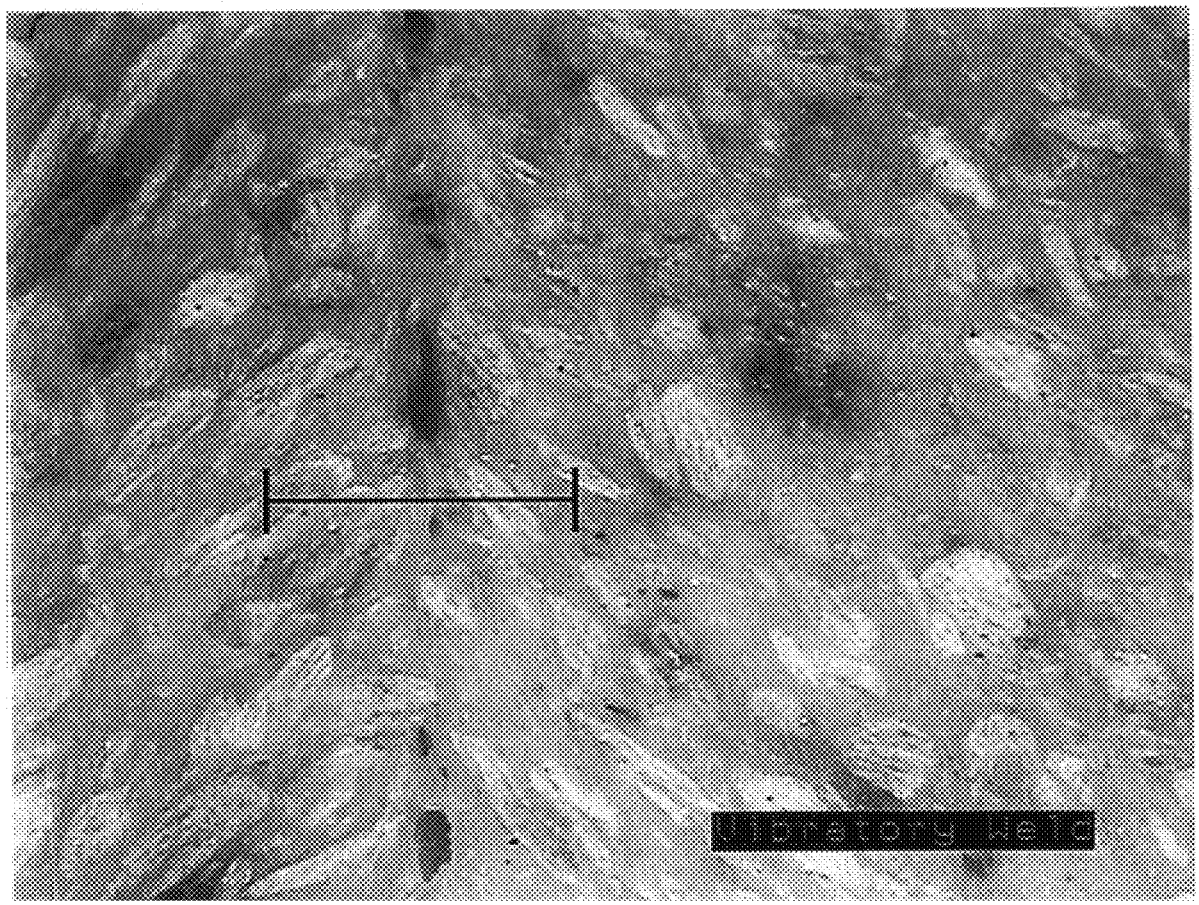
FIG. 15 is a close-up view of the weld area of FIG. 14.

The magnification of FIGS. 12–15 are 14× for FIGS. 12 and 14 and 36× for FIGS. 13 and 15. The material used in the members shown in FIGS. 12–15 is a composite material described in U.S. Pat. Nos. 5,406,768, 5,441,801, and 5,486, 553. The hot plate welding occurred according to the description in the "Experimental" portion of this application, under the heading "Hot Plate Weld".

The vibratory welding occurred with identical parts, with the frequency of vibration being about 200 Hz, an amplitude of 0.035 inches and the duration of vibration being 3 seconds. The members were held together in a fixture at an indicated pressure of 6 psi on the machine.

Thereafter, the weld was sectioned to expose the welded material and weld area. The fibers visible are wood fibers, with a thermoplastic material encompassing the wood fibers in the matrix. (As is evident in FIGS. 14 and 15, there is an outer white surface which is a thermoplastic vinyl coating on the exterior surface of the right member.)

Preferably, the zone of disturbance is less than about 1500 microns wide. Thus, the zone of disturbance is approximately five times larger in the heat weld versus the vibratory weld. More preferably, the zone of disturbance is less than about 1000 microns wide. Most preferably, the zone of disturbance is approximately 500 microns in width, which results in an increased modulus for the welded members in the weld area, as well as minimizing thermoexpansion or contraction. Thus, the method of the present invention results in a weld having a "minimized" zone of disturbance and no thermal degradation which is defined as substantially no fiber misalignment in the area adjacent the weld area. The definition is meant to include any method, or parts which rely on vibration welding as the method to join the parts.

The preferred method of vibrating the members is shown in FIGS. 5–10. Generally, FIGS. 5–10 illustrate a preferred apparatus for practicing of the present invention. The figures depict a prototype and a schematic of a production apparatus which vibrates the members together, thus resulting in a weld.

FIGS. 5–8 illustrate a prototype design to achieve the benefits of the present invention. FIG. 5 illustrates two fixtures 102 and 104. Fixture 102 retains one member to be welded (not shown). Fixture 104 retains another member (not shown) to be welded. Fixtures 102 and 104 are shown without members, and show a variety of securing bolts with just a small portion of securing bolts generally referred to 102a, 102b, 104a and 104b. These retaining bolts retain the member in place.

Figure 6:
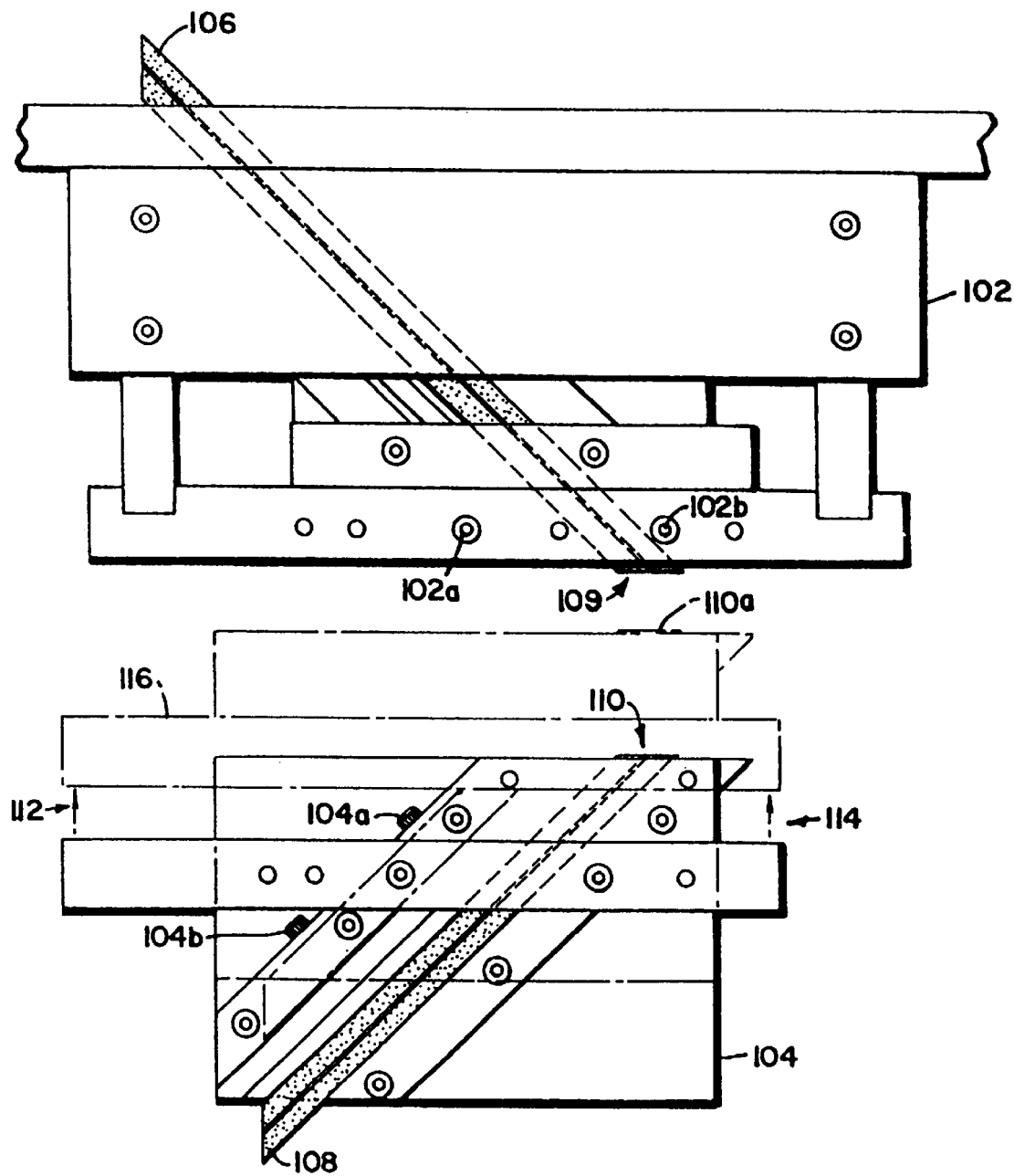
FIG. 6 illustrates the fixtures of FIG. 5 with the members in place prior to welding.

FIG. 6 discloses the fixtures of FIG. 5 with members 106 and 108 in place. The members 106 and 108 are cut with mitered corners, and the faces are shown at 109 and 110. The members 106 and 108 were inserted into the fixtures 102 and 104 by loosening a variety of retaining bolts, some of which are shown as 102a and 102b and 104a and 104b. As is evident from FIG. 6, a very short portion of the members 106 and 108 extend from the fixtures 102 and 104. The small exposed portions minimize the flash which results from the weld.

FIG. 6 illustrates, with arrows 112 and 114, the direction of movement of the bottom fixture 104 in an upward direction, toward fixture 102. A second position is indicated by the dotted line 116 which is meant to indicate fixture 104 in a second position. This position is not the weld position, but is meant to show the travel direction toward a weld position for fixture 104. 110a shows the same face of 110 in a different position, being closer to face 108.

The fixtures 102 and 104 have vibratory heads located thereon. The vibratory heads used in the test fixtures shown in FIGS. 5–8 have an electromechanical vibrator assembly of 240 Hz, a dialable amplitude (stroke) with a feedback loop, an adjustable frequency, an Allen-Bradley SLC 500 Programmable Controller, a maximum part size of 24" l×16" w, an opening between platen of 16", a maximum clamp force of 2,200 lb., an overall machine dimension of 64" w×36" d×73" h, an approximate weight of 4,000 lb., built-in forklift transport tubes, an interior work light, a 5 HP (2.7 kW) solid state power supply, power requirements of 480V AC, 15 amp, 3 phase, 60 Hz, and a minimum air pressure of 60 psi.

Figures 7, 8:
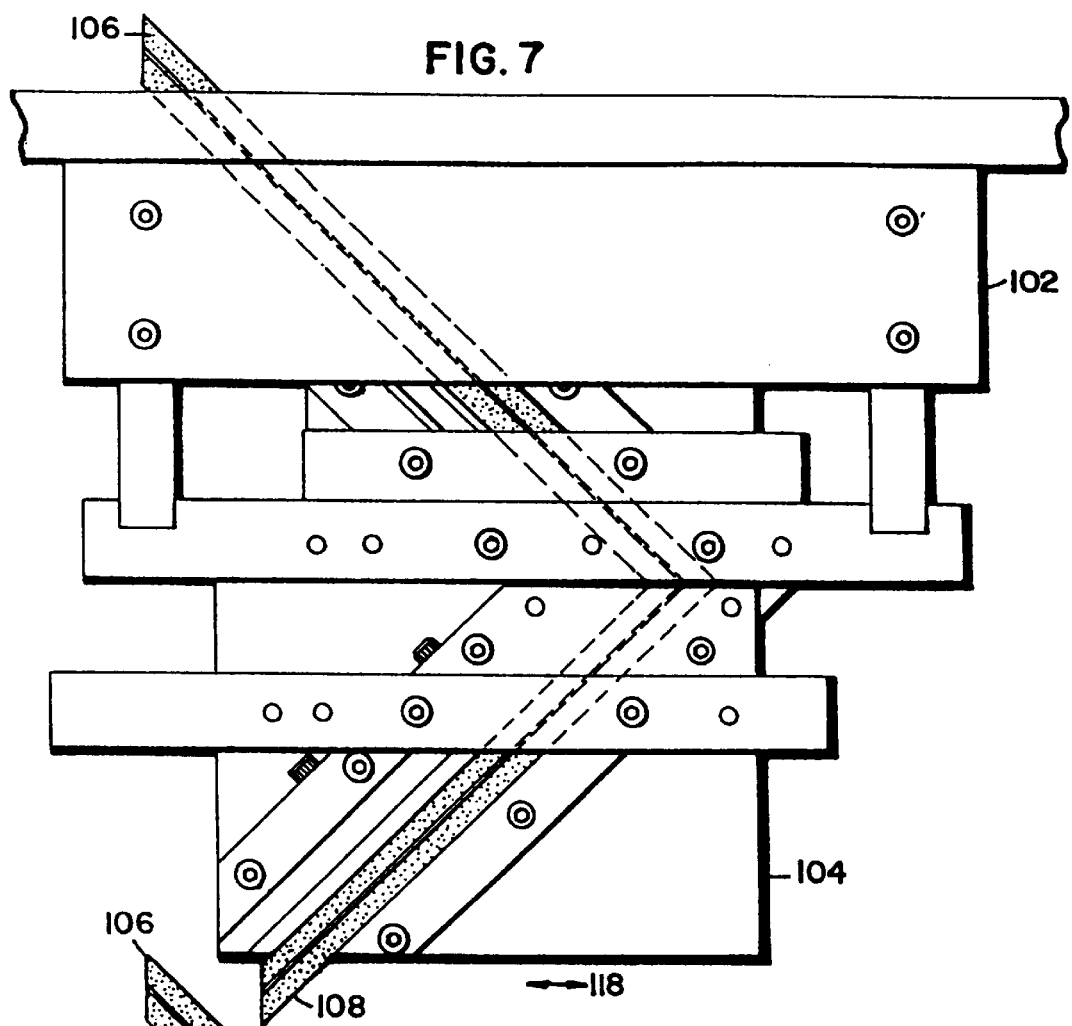
FIG. 7 illustrates the experimental fixtures in a welding mode.
FIG. 8 illustrates the welded members with the bottom member removed from the bottom fixture and the top member still in the fixture.

FIG. 7 illustrates fixtures 102 and 104 in their welding position with members 106 and 108 in contact. In this particular set-up, fixture 104 moves back and forth in the direction of arrows 118 to create a melt pool at faces 108 and 110. This movement in the direction of arrow 118 is the movement described in the experimental section which follows. Fixture 102 stays fixed as fixture 104 moves in the direction of arrow 118.

It appears that the ideal direction of movement is in the direction which maximizes continual contact between the faces. Turning back to FIG. 2, arrow 55 shows the preferred direction of movement. This direction results in the most interface contact during the welding process. If the direction were rotated 90°, as shown by arrow 57, the long faces shown generally as 41 and 45 of FIG. 2 would not be in contact for a long period of time. In other words, if one were welding a perfect circle, the direction of movement would be immaterial. However, if one were welding a long, thin, rectangular face, the direction of the vibration should be in the plane of the long sides of the rectangle to maximize contact during the weld process and minimize flash.

FIG. 8 discloses the final welded members, with member 108 secured to member 106. The member 108 has been removed from fixture 104.

A schematic of a welding apparatus is shown in FIGS. 9 and 10. In FIG. 9, members 120, 122, 124 and 126 are going to be secured together to form a window sash or window or door frame or other four-sided or multi-sided member used in windows and doors. Each member would be fixed in a fixture, and the vibrating heads 128, 132 and 134 are secured to the fixtures and vibrate that portion of the fixture to which the heads are attached. The fixtures are not shown in FIGS. 9 and 10, however, the fixtures utilized in FIGS. 5–8 could be used. Preferably, the fixtures would allow quick mounting and release of the members such that the assembly process is quick.

Preferably, the welding of four members occurs around the glass and is a two step process. Welds at faces 136 and 138 occur first. These faces are welded by initially moving members 120 and 124 in the direction of arrows 140 and 142 respectively. Some movement of members 122 and 126 in the direction of arrows 144 and 146 respectively may also occur such that the faces of the members are in contact. During vibration, the interfaces between members 120, 122, 124 and 126 are in contact with one another and shown as interfaces 136–139 respectively. After the members are brought together, initially, vibrating heads 128 and 132 are vibrated in the direction of arrows 128a and 132a. During this vibration, members 120 and 124 are fixed. This vibration of heads 128 and 132 welds the interfaces shown by arrows 136 and 138. After this welding has taken place, head 134 is vibrated in the direction of arrow 134a which welds interfaces shown by arrows 137 and 139. Thereafter, the welded frame is removed from the fixtures and four new members are inserted in the fixtures to be welded.

The two step process described above could be modified to be one step or additional step if desired. The preferred is described.

An important aspect during welding is that the interface between the members is vibrated away evenly across the full length of the weld. Vibration welding removes only about 0.02 to 0.06 inches from each interface wherein heat welding removes about 0.125 to 0.187 inches. The less interface removed, the better as it results in less flash. In looking at interface 136, there are two portions of the interface of member 120 identified as 148 and 150. Unless the direction from which the pressure is applied pushing members 120 and 122 is adjusted during the vibration welding, the face between portions 148 and 150 would not wear away evenly. To counteract this, the fixtures containing members 122 and 126 should have the pressure directed perpendicular to the face of the weld during the welding process. In this case, such an angle would be a 45° (as measured from the plane of member 122) angle pushing member 122 in the direction of arrow 152. This would ensure that the face of members 120 and 122 would wear away evenly. Such pressure would be simultaneously applied to member 126 during the welding step in the direction of arrow 154. Likewise, during the second step of welding, wherein faces 137 and 139 are welded, members 122 and 120 would be forced against members 124 and 126 in the direction of arrows 156 and 158 respectively. Such pressure would be applied by the fixtures simultaneously during the welding process.

FIG. 10 is a three-sided frame with members 160, 162 and 164. Vibrating heads 166 and 168 are moved simultaneously in the direction shown by arrows 166*a* and 168*a*. Such vibration occurs after member 160 has moved in the direction of arrow 170 and members 162 and 164 are moved in the direction of arrows 172 and 174 respectively. There is only a one step process of vibration for a three member frame.

The above descriptions for FIGS. 9 and 10 are an embodiment and the preferred embodiment at the present time. It is envisioned that other fixtures and vibrating head configurations could be utilized to achieve the welded window and door joints of the present invention. Further, the above can be modified to weld five member frames or other multi-member frames. Thus, pentagons, hexagons, etc. may be produced.

The preferred angle of the mitered corner is 45 degrees, as shown in the figures. However, other angles are envisioned, from the welded members forming a lineal (180 degrees) or any other angle which results from the welding of two members.

The weld is preferably a corner or mitered weld. This "off axis" weld, meaning not a butt or 180° weld, is a particularly advantageous weld to achieve with the present invention. This off axis weld includes mitered welds, compound mitered welds, multi-planar welds wherein the welding surface has different planes, mortis and tenon joints as well as other welds or joints used in the window and door industry as well as other industries addressed herein.

An alternative method and apparatus in accordance with the present invention would be rather than vibrating the actual members, a third corner member is vibrated, which is in contact with the faces of the member. This third member would be some type of thermoplastic material which would become part of the finished welded article. In this embodiment, the long members would preferably be stationary, and the third corner member would be held in a fixture with a vibrating head in the third member's fixture. The vibration of the third member would heat up the face between the first member and the third member and the second member and the third member, thus resulting in a weld.

Yet another alternative method would employ the use of a center mullion which would be secured to the top and bottom rail of the window. The center mullion would divide the window configuration into two windows. In this method, the center mullion could vibrate in a horizontal plane, with pressure being applied to the top and bottom lineals, in the direction of the center mullion. This vibration process would secure the top and bottom rail to the center mullion, and the side stiles could be secured either during the attachment of the rail to the mullion or after. Additional mullions could be employed to produce a multi-paned window Thus, the present invention envisions multi-paned and multi-style rails and mullions to produce an infinite number of sizes and shapes of windows.

Yet another alternative method could include a multi-member joint or weld. This weld could employ, as a non-limiting example, a three member weld with a 120° angle between each weld. All three members could be moved simultaneously, or in some sequential fashion.

FIGS. 5–8 were the test fixtures used to generate the data in the experimental section which follows.

EXPERIMENTAL

FIGS. 5–8 detail an experimental fixture through which welded members were created. The material used in the experiment was FIBREX™, a composition of PVC and wood, manufactured by Andersen Corporation and, described in U.S. Pat. No. 5,406,768. The test method used to test the weld is described in detail in *German Welding Society,* Guidelines DVS2207, Part 25, published October 1989. These Guidelines describe welding thermoplastic plastics with heated tool butt welds. In particular, the testing of welded joints is described in paragraph 10 of these guidelines. The parameters and results of the welded components are as follows:

Heat Up Time

This is the time it takes to heat a test member from room temperature to its lowest welding temperature of above 240° C.

Cool Down Cycle

This is the time for the joined surfaces to cool below their melt point so that the bonded members have some bond strength.

Hot Plate Weld Time

This is the period during which the melted faces are brought together under pressure and held firmly.

A recommendation of the German Welding Institute suggests that the "Heat Up Time" is actually controlled mechanically by "burning off" 3 mm (0.120) of the profile before the surfaces are brought together. At their recommended minimum temperature of 245° C. this results in an approximate "Heat Up Time" of 15 seconds plus a "Weld Cycle Time" of 7 seconds and a "Cooling Cycle Time" of 25 seconds for a total of 47 seconds per cycle.

Rigid PVC fuses fully at approximately 204° C. At this temperature both primary and secondary fusion has taken place with no degradation of the material due to HCl generation. However, at higher temperatures, degradation does take place as evidenced by discoloration of flash at the joint. Higher temperatures can minimize the heat up/cool down period but with the risk of severe degradation and even inferior weld strengths.

Vibratory Welding

The proposed welded surfaces are vibrated—one against the other at a frequency of approximately 200 Hz. A combination of amplitude of the vibration, the time of the vibration and applied pressure combine to give a melt pool in the interface and results in a welded surface. This process has several advantages:

1) weld temperature never exceeds the melt temperature of the material being welded.
2) cycle times are fast (typically 2 to 4 seconds).
3) heating and cooling areas are very localized resulting in "instant cooling" (when compared to hot plate welding).
4) flash is very limited.

RESULTS

From the following results, it can be clearly seen that vibration welding is a superior process to hot plate welding. Tables 1–5 illustrate vibratory welding utilizing the profile shown in FIG. 11. The amplitude and weld time have been varied to determine the variation which occurs on the load at break. The frequency of the vibration was approximately 200 Hz for all examples in Tables 1–5. A summary follows Table 5.

TABLE 1

| Amplitude | .030 | .030 | .030 | .030 | .030 |
|---|---|---|---|---|---|
| Weld Time | 4 Secs | 4 Secs | 4 Secs | 4 Secs | 4 Secs |
| Pressure | 6 psi | 6 psi | 6 psi | 6 psi | 6 psi |
| Load at Break (Newtons) | 585 | 565 | 580 | 570 | 595 |

TABLE 2

| Amplitude | .035 | .035 | .035 | .035 | .035 |
|---|---|---|---|---|---|
| Weld Time | 4 Secs | 4 Secs | 4 Secs | 4 Secs | 4 Secs |
| Pressure | 6 psi | 6 psi | 6 psi | 6 psi | 6 psi |
| Load at Break (Newtons) | 635 | 580 | 590 | 605 | 635 |

TABLE 3

| Amplitude | .040 | .040 | .040 | .040 | .040 |
|---|---|---|---|---|---|
| Weld Time | 4 Secs | 4 Secs | 4 Secs | 4 Secs | 4 Secs |
| Pressure | 6 psi | 6 psi | 6 psi | 6 psi | 6 psi |
| Load at Break (Newtons) | 600 | 580 | 550 | 595 | 570 |

TABLE 4

| Amplitude | .040 | .040 | .040 | .040 | .040 |
|---|---|---|---|---|---|
| Weld Time | 3.5 Secs | 3.5 Secs | 3.5 Secs | 3.5 Secs | 3.5 Secs |
| Pressure | 6 psi | 6 psi | 6 psi | 6 psi | 6 psi |
| Load at Break (Newtons) | 670 | 640 | 600 | 670 | 600 |

TABLE 5

| Amplitude | .035 | .035 | .035 | .035 | .035 |
|---|---|---|---|---|---|
| Weld Time | 4.5 Secs | 4.5 Secs | 4.5 Secs | 4.5 Secs | 4.5 Secs |
| Pressure | 6 psi | 6 psi | 6 psi | 6 psi | 6 psi |
| Load at Break (Newtons) | 615 | 695 | 665 | 640 | 605 |

TABLE 5-continued

Summary of Vibration Welding TABLE 5

Max 695
Min 605
Ave 644
Std Dev 28.8

Table 6 details a hot plate weld, illustrating the prior art process, for the same profile as used in Tables 1–5. A summary of hot plate welding follows Table 6.

TABLE 6

Hot Plate Weld

Hot Plate Weld Temp. 245° C.
Weld Time         7 seconds
Cooling Time      35 seconds
Burn Off          3 mm (.120") - 15 second average time to achieve Results (Newtons)

| Sample 1 | 525 |
|---|---|
| Sample 2 | 555 |
| Sample 3 | 540 |
| Sample 4 | 640 |
| Sample 5 | 590 |
| Sample 6 | 605 |
| Sample 7 | 580 |
| Sample 8 | 585 |
| Sample 9 | 565 |
| Sample 10 | 570 |
| Sample 11 | 575 |
| Sample 12 | 605 |
| Sample 13 | 490 |
| Sample 14 | 595 |
| Sample 15 | 615 |
| Sample 16 | 620 |
| Sample 17 | 565 |
| Sample 18 | 570 |
| Sample 19 | 575 |
| Sample 20 | 605 |
| Sample 21 | 490 |
| Sample 22 | 595 |
| Sample 23 | 615 |
| Sample 24 | 620 |
| Sample 25 | 630 |
| Sample 26 | 535 |
| Sample 27 | 600 |
| Sample 28 | 580 |
| Sample 29 | 545 |
| Sample 30 | 555 |
| Sample 31 | 565 |
| Sample 32 | 495 |
| Sample 33 | 590 |
| Sample 34 | 585 |
| Sample 35 | 525 |
| Sample 36 | 585 |
| Sample 37 | 565 |
| Sample 38 | 535 |
| Sample 39 | 545 |
| Sample 40 | 580 |
| Sample 41 | 565 |
| Sample 42 | 570 |
| Sample 43 | 575 |
| Sample 44 | 630 |
| Sample 45 | 535 |
| Sample 46 | 600 |
| Sample 47 | 590 |
| Sample 48 | 585 |
| Sample 49 | 525 |
| Sample 50 | 605 |
| Sample 51 | 490 |

TABLE 6-continued

Hot Plate Weld

| Sample 52 | 595 |
| Sample 53 | 615 |
| Sample 54 | 620 |
| Sample 55 | 580 |
| Sample 56 | 545 |
| Sample 57 | 555 |
| Sample 58 | 565 |
| Sample 59 | 495 |
| Sample 60 | 585 |
| Sample 61 | 565 |
| Sample 62 | 535 |
| Sample 63 | 545 |
| Sample 64 | 580 |

Figure 11:
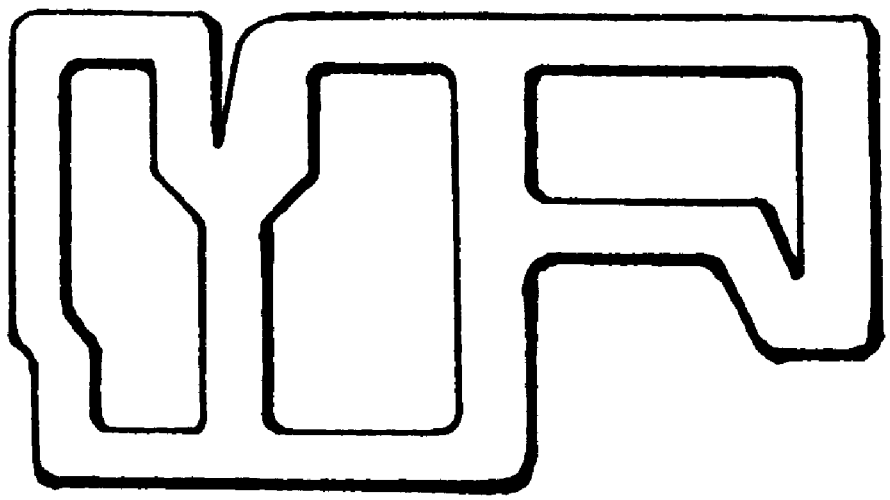
FIG. 11 illustrates a cross-sectional view of a test profile.

Summary of Hot Plate Welding
Profile FIG. 11
Max 640
Min 490
Ave 571
Std Dev 28

Sash Profile—FIG. 2—Vibratory Weld

TABLE 7

| Amplitude | Weld Time | Pressure Indicated | Load at Break (Newtons) |
| --- | --- | --- | --- |
| .040 | 2.75 secs. | 6 psi. | 860 |
| .040 | 2.75 secs. | 6 psi. | 785 |
| .040 | 2.75 secs. | 6 psi. | 780 |
| .040 | 2.75 secs. | 6 psi. | 740 |
| .040 | 2.75 secs. | 6 psi. | 720 |
| .040 | 2.75 secs. | 6 psi. | 777 |
| .040 | 2.75 secs. | 6 psi. | 685 |
| .040 | 2.75 secs. | 6 psi. | 770 |
| .040 | 2.75 secs. | 6 psi. | 755 |
| .040 | 2.75 secs. | 6 psi. | 730 |

Sash Profile—FIG. 2

Hot Plate Weld

TABLE 8

| Burn Off | Weld Temp. | Hold Time | Cool Time | Load at Break (Newtons) |
| --- | --- | --- | --- | --- |
| 3 mm. | 245° C. | 7 secs. | 25 secs. | 680 |
| 3 mm. | 245° C. | 7 secs. | 25 secs. | 710 |
| 3 mm. | 245° C. | 7 secs. | 25 secs. | 670 |
| 3 mm. | 245° C. | 7 secs. | 25 secs. | 620 |
| 3 mm. | 245° C. | 7 secs. | 25 secs. | 660 |
| 3 mm. | 245° C. | 7 secs. | 25 secs. | 650 |
| 3 mm. | 245° C. | 7 secs. | 25 secs. | 620 |
| 3 mm. | 245° C. | 7 secs. | 25 secs. | 670 |
| 3 mm. | 245° C. | 7 secs. | 25 secs. | 680 |
| 3 mm. | 245° C. | 7 secs. | 25 secs. | 640 |

TABLE 9

Summary of Load at Break for Vibrating Welding

Mean 760
Max 860
Min 685
Std Dev 34

TABLE 10

Summary of Load at Break for Hot Plate

Mean 660
Max 710
Min 620
Std Dev 22

In both the first and second set of experiments, the load at break was higher for vibration welding than hot plate welding. Thus, a stronger weld results with a shorter weld time. The above experimental results support the patentability of the present invention.

As is evident from the above results, the present invention provides a weld which is stronger than a heat weld. In some situations, the weld can be as much as 20 percent stronger. The weld time for vibration welding is less than half that of a heat weld. Reducing the weld time in half is very significant in the production of fenestration products, which are manufactured in large quantities. As discussed earlier, often times millions of units a year have to be produced, and the shorter the weld time, fewer shifts are necessary to complete the manufacture of a specified number of units. Furthermore, the weld is superior in strength to any weld, thus indicating the numerous advantages of the present invention.

Therefore, it may be seen that the invention offers several advantages over conventional welding techniques. As one skilled in the art would appreciate the various modifications could be made to the invention without departing from the spirit and scope of the invention, the invention thus resides in the claims hereafter appended.

We claim:

1. A method of welding at least two members together, said method comprising the steps of:
   (a) selecting at least first and second members to be joined, each of said members having a sealing face, said members configured so as to be a stile or rail of a window or sash or door, said members having thermoplastic properties sufficient such that localized flow can occur through the application of frequency generated vibrations;
   (b) generating repetitive movements to at least one of said faces using a means for vibrating said one of said faces at a frequency range of at least about 50 Hz to 1000 Hz; said movements to said one of said faces creating a melt pool of material at said one of said faces which will create a weld upon solidifying when in contact with the other of said faces;
   (c) placing said other of said faces in contact with said one of said faces prior to said melt pool solidifying, thereby creating a weld between said first and second member.

2. The method of claim 1 wherein a melt pool at the sealing face occurs in approximately 1 to 5 seconds.

3. The method of claim 1 wherein substantially only said faces are heated thereby minimizing flash and thermal degradation of adjacent areas to said other of said faces.

4. The method of claim 1 wherein said means operates in the range of about 50 to 500 Hz.

5. The method of claim 1 wherein said means operates in the range of about 150 to 250 Hz.

6. The method of claim 1 wherein said means for vibrating moves said first member against a stationary second member.

7. The method of claim 1 wherein said means for vibrating is a platen which is in contact with said one of said first faces, whereby the platen is moved with a frequency of 50 to 500 Hz.

8. The method of claim 1 wherein said first and said second members are moved concurrently, with said sealing faces in contact during movement.

9. The method of claim 1 wherein a third member, positioned between said first and second member is vibrated to form a weld.

10. The method of claim 1 wherein said melt pool of material creating a zone of disturbance between said members where the orientation of said material differs from the orientation throughout the remaining portion of said welded members said zone of disturbance being less than approximately 1500 microns.

11. A method of welding at least two members together, said method comprising the steps of:
   (a) selecting at least first and second members to be joined, each of said members having a sealing face, said members configured so as to be a stile or rail of a window sash or door, said members having thermoplastic properties sufficient such that localized flow can occur through the application of frequency generated vibrations;
   (b) generating repetitive movements using a vibrating platen, said vibrating platen vibrating at a frequency range of of at least about 50 Hz to 1000 Hz;
   (c) contracting said platen to said one of said sealing faces, thus vibrating said sealing face;
   (d) creating a melt pool of material at said faces which will create a weld upon solidifying;
   (e) removing said platen from said sealing face;
   (f) maintaining said other of said faces in contact with the other prior to said melt pool solidifying, thereby creating a weld between said first and second member.

12. The method of claim 11 wherein said platen does not begin vibrating until said platen contacts said sealing face.

13. The method of claim 11 wherein said weld occurred in approximately 1 to 5 seconds.

14. The method of claim 11 wherein substantially only said faces are heated thereby minimizing flash and thermal degradation of adjacent area to said faces.

15. The method of claim 11 wherein said melt pool of material creating a zone of disturbance between said members where the orientation of said material differs from the orientation throughout the remaining portion of said welded members, said zone of disturbance being less than approximately 1500 microns.

16. A method of welding at least two members together, said method comprising the steps of:
   (a) selecting at least first and second members to be joined, each of said members having a sealing face, said members having thermoplastic properties sufficient such that localized flow can occur through the application of frequency generated vibrations;
   (b) generating repetitive movements to at least one of said faces using a means for vibrating said one of said faces using a means for vibrating said one of said faces at a frequency range of at least about 50 Hz to 1000 Hz; said movements to said one of said faces creating a melt pool of material at said faces which will create a weld upon solidifying when in contact with the other of said faces;
   (c) maintaining said other of said faces in contact with said one of said faces prior to said melt pool solidifying, thereby creating a weld between said first and second member.

17. The method of claim 16 wherein said members are configured to be a stile or rail of a window frame or window sash or door frame.

18. The method of claim 16 wherein said melt pool of material creating a zone of disturbance between said members where the orientation of said material differs from the orientation throughout the remaining portion of said welded members, said zone of disturbance being less than approximately 1500 microns.

19. A method of welding at least two members together, said method comprising the steps of:
   (a) selecting at least first and second members to be joined, each of said members having a sealing face, said members configured so as to be a stile or rail of a window or sash or door, said members having thermoplastic properties sufficient such that localized flow can occur through the application of frequency generated vibrations;
   (b) generating repetitive movements to at least one of said faces using a means for vibrating said one of said faces at a frequency range of at least about 50 Hz to 1000 Hz; said movements to said one of said faces creating a melt pool of material at said one of said faces which still create a weld upon solidifying when in contact with the other of said faces;
   (c) placing said other of said faces in contact with said one of said faces prior to said melt pool solidifying, thereby creating a weld between said first and second member, said zone of disturbance being substantially less than 1500 microns.

20. The method of claim 19 wherein said melt pool of material creating a zone of disturbance between said members where the orientation of said material differs from the orientation throughout the remaining portion of said welded members, said zone of disturbance being substantially less than 1000 microns.

21. The method of claim 19 wherein said melt pool of material creating a zone of disturbance between said members where the orientation of said material differs from the orientation throughout the remaining portion of said welded members, said zone of disturbance being substantially less than 500 microns.

22. A method of welding at least two members together, said method comprising the steps of:
   (a) selecting at least first and second members to be joined, each of said members having a sealing face, said members configured so as to be a stile or rail of a window or sash or door, said members having thermoplastic properties sufficient such that localized flow can occur through the application of frequency generated vibrations;
   (b) generating repetitive movements to at least one of said faces using a means for vibrating said one of said faces at a frequency of at least about 50 Hz; said movements to said one of said faces creating a melt pool of material at said one of said faces which will create a weld upon solidifying when in contact with the other of said faces;
   (c) placing said other of said faces in contact with said one of said faces prior to said melt pool solidifying, thereby creating a weld between said first and second member said melt pool of material creating a zone of disturbance between said members where the orientation of said material differs from the orientation throughout the remaining portion of said welded members, said zone of disturbance being less than approximately 1500 microns.

23. A method of welding at least two members together, said method comprising the steps of:

(a) selecting at least first and second members to be joined, each of said members having a sealing face, said members configured so as to be a stile or rail of a window sash or door, said members having thermoplastic properties sufficient such that localized flow can occur through the application of frequency generated vibrations;

(b) generating repetitive movements using a vibrating platen, said vibrating platen vibrating at a frequency of above about 50 Hz;

(c) contracting said platen to said one of said sealing faces, thus vibrating said sealing face;

(d) creating a melt pool of material at said faces which will create a weld upon solidifying;

(e) removing said platen from said sealing face;

(f) maintaining said other of said faces in contact with the other prior to said melt pool solidifying, thereby creating a weld between said first and second member said melt pool of material creating a zone of disturbance between said members where the orientation of said material differs from the orientation throughout the remaining portion of said welded members, said zone of disturbance being less than approximately 1500 microns.

24. A method of welding at least two members together, said method comprising the steps of:

(a) selecting at least first and second members to be joined, each of said members having a sealing face, said members having thermoplastic properties sufficient such that localized flow can occur through the application of frequency generated vibrations;

(b) generating repetitive movements to at least one of said faces using a means for vibrating said one of said faces using a means for vibrating said one of said faces at a frequency of at least about 50 Hz; said movements to said one of said faces creating a melt pool of material at said faces which will create a weld upon solidifying when in contact with the other of said faces;

(c) maintaining said other of said faces in contact with said one of said faces prior to said melt pool solidifying, thereby creating a weld between said first and second member said melt pool of material creating a zone of disturbance between said members where the orientation of said material differs from the orientation throughout the remaining portion of said welded members, said zone of disturbance being less than approximately 1500 microns.

25. A method of welding at least two members together, said method comprising the steps of:

(a) selecting at least first and second members to be joined, each of said members having a sealing face, said members configured so as to be a stile or rail of a window or sash or door, said members having thermoplastic properties sufficient such that localized flow can occur through the application of frequency generated vibrations;

(b) generating repetitive movements to at least one of said faces using a means for vibrating said one of said faces at a frequency of at least about 50 Hz; said movements to said one of said faces creating a melt pool of material at said one of said faces which still create a weld upon solidifying when in contact with the other of said faces;

(c) placing said other of said faces in contact with said one of said faces prior to said melt pool solidifying, thereby creating a weld between said first and second member, said melt pool of material creating a zone of disturbance between said members where the orientation of said material differs from the orientation throughout the remaining portion of said welded members, said zone of disturbance being substantially less than 1000 microns.

* * * * *